US010999570B2

(12) United States Patent
Banta

(10) Patent No.: US 10,999,570 B2
(45) Date of Patent: May 4, 2021

(54) PORTABLE SYSTEM FOR TAKING PHOTOGRAMMETRY IMAGES AND RELATED METHOD

(71) Applicant: Johnathan R. Banta, Newhall, CA (US)

(72) Inventor: Johnathan R. Banta, Newhall, CA (US)

(*) Notice: Subject to any disclaimer, the term of this patent is extended or adjusted under 35 U.S.C. 154(b) by 0 days.

(21) Appl. No.: 16/559,149

(22) Filed: Sep. 3, 2019

(65) Prior Publication Data

US 2020/0077080 A1 Mar. 5, 2020

Related U.S. Application Data

(60) Provisional application No. 62/726,440, filed on Sep. 4, 2018.

(51) Int. Cl.
*H04N 13/282* (2018.01)
*H04N 5/225* (2006.01)
*G06K 9/22* (2006.01)
*G06K 9/20* (2006.01)

(52) U.S. Cl.
CPC ......... *H04N 13/282* (2018.05); *G06K 9/2027* (2013.01); *G06K 9/224* (2013.01); *H04N 5/2251* (2013.01); *H04N 2213/001* (2013.01)

(58) Field of Classification Search
CPC .... G06K 9/2027; G06K 9/224; H04N 13/282; H04N 2213/001; H04N 5/2251
See application file for complete search history.

(56) References Cited

U.S. PATENT DOCUMENTS

| | | | | |
|---|---|---|---|---|
| 2010/0033479 A1* | 2/2010 | Hirayama | ............. | G06F 3/0325 345/419 |
| 2010/0142758 A1* | 6/2010 | Pinhas | ............... | H04N 1/32128 382/103 |
| 2012/0069141 A1* | 3/2012 | Sim | ...................... | H04N 5/2355 348/36 |
| 2016/0195798 A1* | 7/2016 | Nenov | ................... | F16M 13/04 348/373 |
| 2019/0221033 A1* | 7/2019 | Messerlie | ............... | G06T 7/593 |

* cited by examiner

*Primary Examiner* — Joon Kwon
(74) *Attorney, Agent, or Firm* — Kelly & Kelley, LLP

(57) ABSTRACT

A lightweight, portable and configurable system for image acquisition for photogrammetry purposes includes a portable rig having at least two cameras supported thereon in spaced relation to one another. The cameras are angled towards one another and actuated in an automated fashion so as to capture images of an object at a minimum rate over time. At least a plurality of the captured images are used to digitally reconstruct three-dimensional geometry of the object.

23 Claims, 16 Drawing Sheets

PORTABLE SYSTEM FOR TAKING PHOTOGRAMMETRY IMAGES AND RELATED METHOD

RELATED APPLICATIONS

This application claims the benefit of U.S. Provisional Application No. 62/726,440, filed on Sep. 4, 2018.

BACKGROUND OF THE INVENTION

The present invention generally relates to photogrammetry. More particularly, the present invention is directed to a lightweight, portable, configurable system for taking photogrammetry images and the method of using the same.

Photogrammetry is the process of analyzing multiple photographs to reconstruct three-dimensional geometry through the use of software programs. These programs require imagery that is photographed in a specific manner, so as to best utilize their solving algorithm.

Typically, these are photographs taken under very controlled conditions, with complex camera systems, but may also be the result of analyzing a video source, or multiple hand-held images taken with a still camera. The result is often that the camera systems are too cumbersome, not easily transported, or the number and placement of images insufficient. Scene lighting is also a major concern, but in many cases the photographic conditions are not controllable. Specific discipline is required to take the photos, or a significant amount of images must be acquired over a period of time in which the subject might move, rendering the photos useless.

Accordingly, there is a continuing need for a system and method for capturing photographs which is portable, so as to be easily transported, even manually, and is not too cumbersome. What is also needed is a system in which the number and placement of images is sufficient for the photogrammetry purposes, including digitally reconstructing three-dimensional geometry of the object which is the subject of the captured photographs. Such a system should be able to acquire data in the form of captured images from relatively small objects or large areas using a single, portable and adjustable and configurable device. The present invention fulfills these needs, and provides other related advantages.

SUMMARY OF THE INVENTION

The present invention resides in a portable system for capturing images for purposes of photogrammetry. The system comprises a portable, typically handheld, rig. The rig may comprise a pole, such as a monopod pole or the like.

At least two cameras are supported on the rig in spaced relation to one another. The cameras are angled towards one another and automatedly actuated so as to capture images of an object at a minimum rate over time. At least a plurality of the captured images are used to digitally reconstruct three-dimensional geometry of the object.

The pole comprising the rig may be comprised of at least two sections. These sections may be telescopically fitted to one another. Additional sections, or multiple rigs or poles, may be removably connected to one another. This enables the cameras attached to different sections or poles to be selectively adjusted in distance relative to one another.

The cameras are attached to the rig such that the position or orientation of the camera relative to the rig may be selectively adjustable. The cameras may comprise two cameras angled between 5 and 22.5 degrees towards one another. The cameras may be angled approximately 10 degrees towards one another.

The cameras may comprise a relatively small, lightweight camera or video camera. In one embodiment, the cameras comprise cameras of smartphones coupled to the rig. Each of the cameras comprise small format cameras. These can comprise, for example, cameras of smartphones. A light source may also be coupled to the rig.

The cameras capture images at a given rate over time. This may be done by using burst mode of the camera. Alternatively, an intervalometer may be associated with the cameras to actuate the cameras and control the rate of images captured over time.

In accordance with the invention, a method for capturing photogrammetry images comprises providing a portable rig supporting at least two cameras in spaced apart relation to one another. The cameras may be directed towards one another at an angle between 5 degrees and 22.5 degrees. The cameras may be directed towards one another at an angle of approximately 10 degrees. The cameras are automatically actuated so that they capture images of an object at a minimum rate over time. At least a plurality of the captured images are used to digitally reconstruct a three-dimensional geometry of the object. The rig is moved relative to the object as the cameras capture images of the object. The rig is preferably handheld and manually moved relative to the object.

A position or orientation of a camera relative to the rig may be adjusted. This may be done, for example, by increasing the distance between the cameras by increasing the size of the portable rig. The cameras may also be rotated or pivoted.

The cameras may be automatedly actuated by utilizing a burst mode of the cameras or an intervalometer or intervalometer software associated with the cameras. The cameras may be actuated substantially simultaneously. The object or subject filmed may be illuminated by providing a light source supported by the portable rig.

The captured images are downloaded to a computer for processing by a photogrammetry software application, which may digitally reconstruct a three-dimensional geometry of the object using at least a plurality of the captured images.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention is directed to a system and method for capturing images for photogrammetry, wherein at least a plurality of the captured images are used to digitally reconstruct a three-dimensional geometry of the object from two-dimensional images taken of the object. The system of the present invention eschews the need for fixed camera devices and reduces acquisition time by photographing a rapid number of images using video, burst mode, or intervalometer control. The system uses at least two cameras, or may be joined with other sets of the device to capture large areas, such as being individually expanded to cover large terrains or objects, or be reduced to a smaller arrangement for increased portability.

As is illustrated and will be more fully described herein, the present invention comprises a unique portable, expandable, scalable, handheld and versatile camera rigging system for stereo photography and photogrammetry reference or for acquiring stereo photography and photogrammetry reference images using lightweight programmable cameras and/or camera controllers for video, intervalometer or burst mode acquisition. The system may be constructed and utilized using off-the-shelf hardware and software combined and used in a unique and advantageous manner, or use specifically designed hardware in similar configuration.

Figure 1:
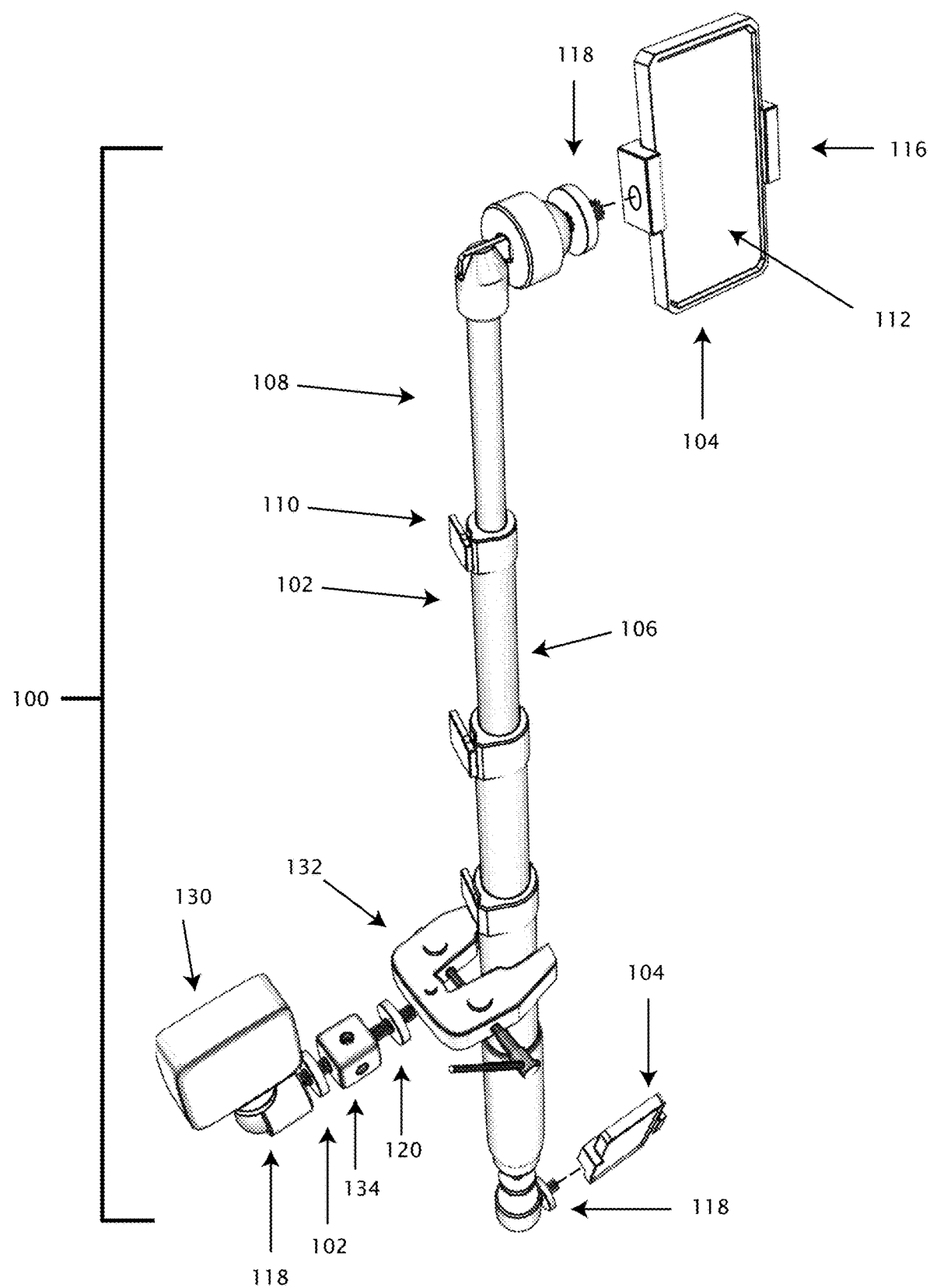
FIG. 1 is a partially exploded perspective view of a device used in connection with the system and method of the present invention.
Figure 2:
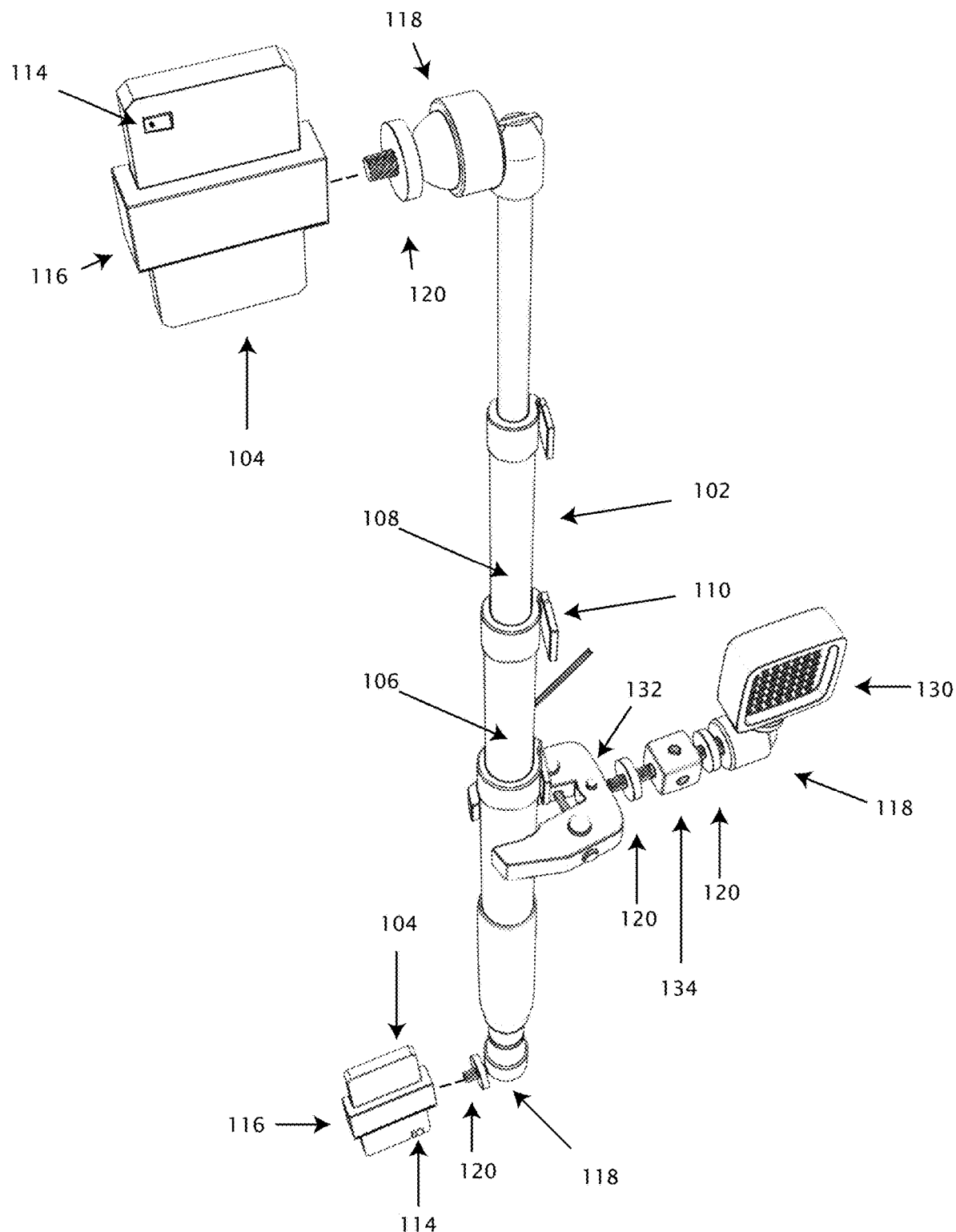
FIG. 2 is a front side view of the device of FIG. 1.
Figure 3:
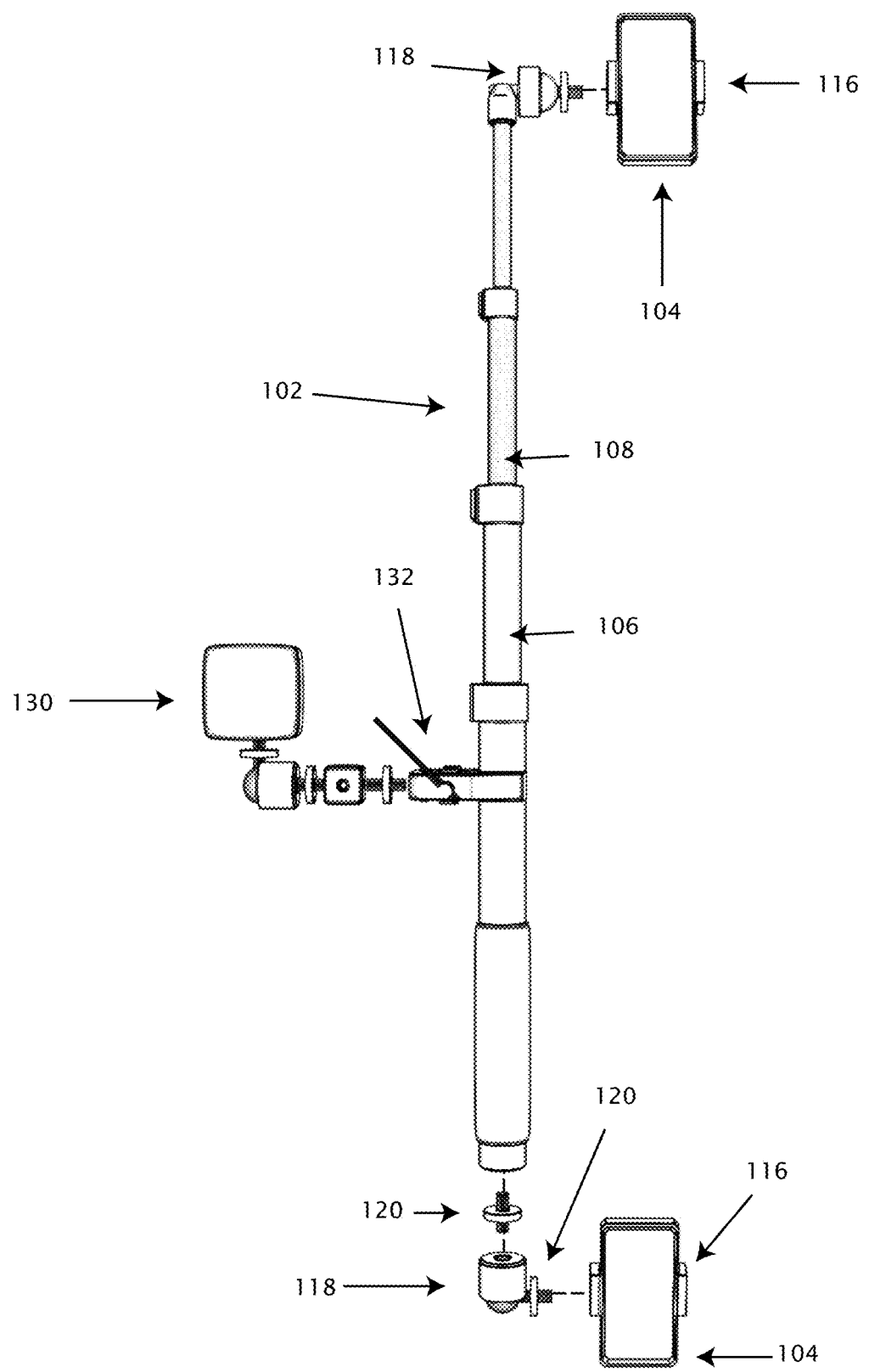
FIG. 3 is a partially exploded elevational view of the device of FIG. 1.
Figure 4:
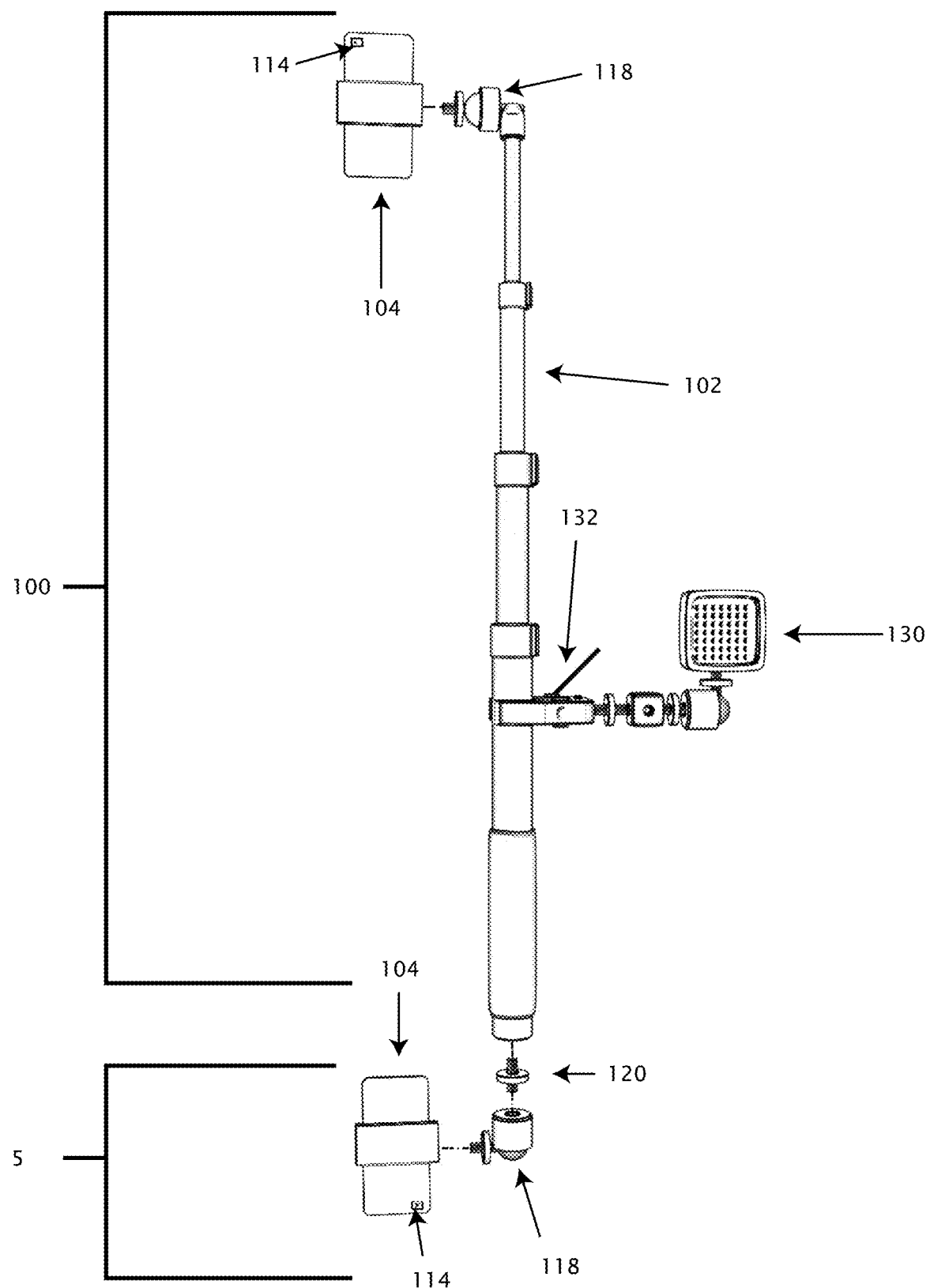
FIG. 4 is an opposite view of FIG. 3, illustrating adjustable attachment of a camera to a rig of the device, in accordance with the present invention.

With reference now to FIG. 1, a device 100 used in accordance with the system and method of the present invention is shown. The device 100 comprises a portable rig 102 which supports a plurality of cameras 104 thereon in spaced relation to one another. Preferably, the rig 102 is handheld and manually portable so as to be carried and moved by an individual while capturing images of an object or area for later processing by means of photogrammetry, stereo photography or the like, such as digitally reconstructing three-dimensional geometry of the object using the two-dimensional captured images.

The rig 102 may comprise a pole, monopod or the like. The pole or rig may have at least two sections 106 and 108 which are removably connected to one another or telescopically fitted to one another, as illustrated herein. As illustrated in FIG. 1, section 108 telescopically fits within section 106. Clamp 110 may be used to lock the sections 106 and 108 in an extended or retracted position. The pole or rig 102 may include multiple such sections and locks or clamps so as to selectively adjust the length of the rig 102, and thus the distance between the cameras 104, such that in a retracted position the device 100 may be used to capture images of an object which is relatively small or close, whereas in an extended and enlarged condition the device 100 is used to capture images of a large device or a large area.

Preferably, multiple cameras, such as the illustrated two cameras 104, are attached to the rig 102 to accomplish the objects of the present invention. It will be understood, however, that three or even more cameras 104 may be attached to the rig 102 and utilized. The cameras 104 preferably comprise small format cameras which are lightweight, portable, and capable of capturing images via video, burst mode, intervalometer control and/or intervalometer software associated with the camera 104 or the like. The cameras 104 may be actuated in automated fashion, such as selecting burst mode, continuous video, intervalometer software or device control, or being actuated remotely, such as by Wi-Fi, Bluetooth or the like. Various figures herein, including FIGS. 1-6, illustrate the use of a smartphone which is used as the camera 104. As is well known, a smartphone has a display screen 112 typically on one face thereof and a camera 114 on an opposite face thereof. The use of smartphones in the present invention is particularly desirable as they are ubiquitous, can take video or photograph images, can be easily controlled by intervalometer software or other software to control the camera, are autofocusing and of relatively high-quality images, and the images which are taken can be seen from the screens 112 as the operator of the device 100 is capturing images of the object or area being photographed. However, it will be understood that other cameras which are lightweight and portable and which accomplish the object of the present invention can be used, such as the cube-shaped cameras 104 illustrated in FIG. 7. Such cameras as illustrated in FIG. 7 could comprise a Polaroid Cube™, GoPro™, or other action camera, or the like.

Figure 5:
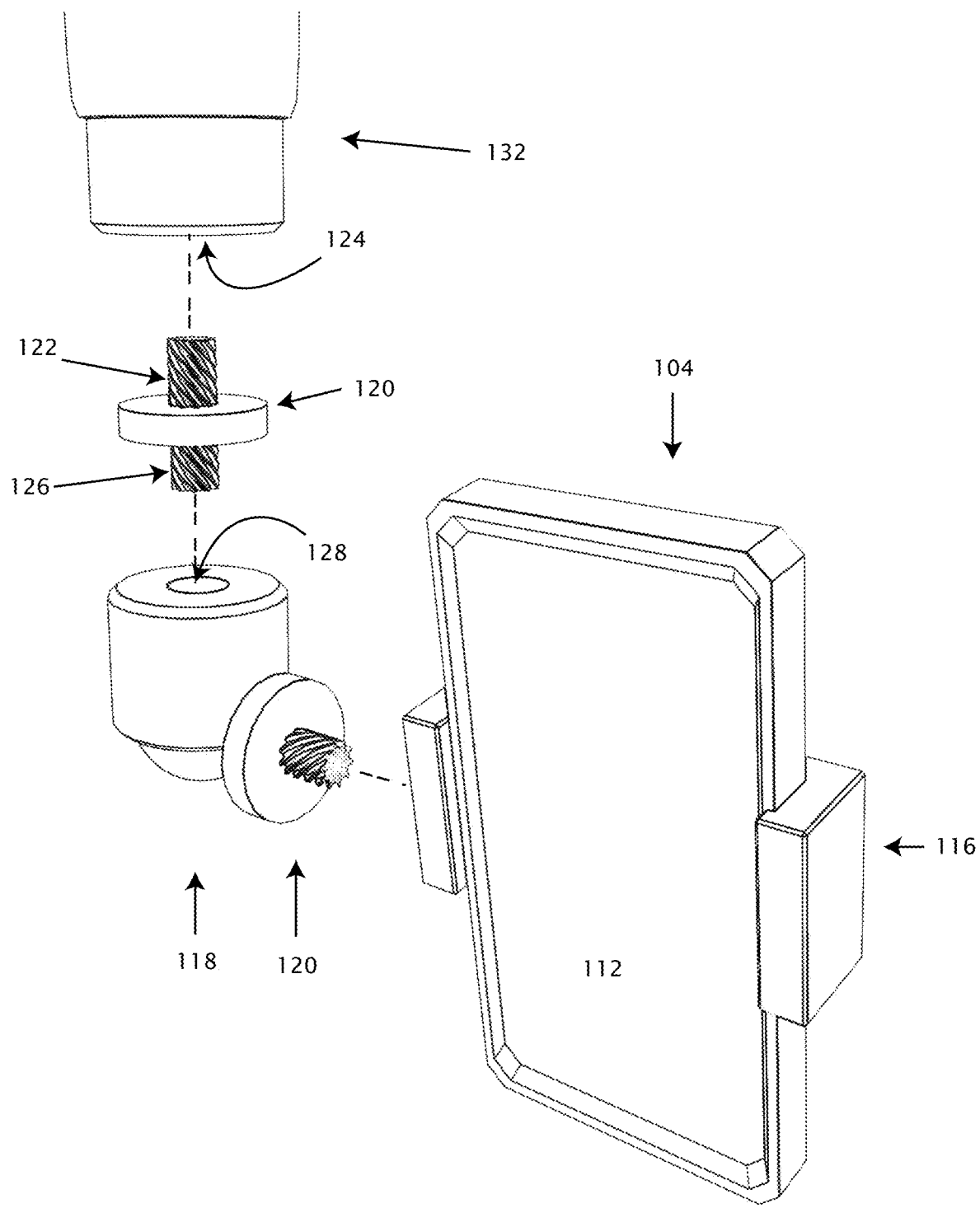
FIG. 5 is a fragmented and enlarged perspective view of area "5" of FIG. 4.

With reference again to FIGS. 1-4, the cameras 104 are attached to the rig 102 such that the position or orientation of the camera 104 relative to the rig 102 is selectively adjustable. Typically, the cameras 104 are in spaced relation to one another, such as being attached to different sections or ends of the rig 102. As discussed above, in at least some embodiments of the present invention, this distance between the cameras 104 can be selectively modified by expanding or contracting the length of the rig 102. With reference to FIG. 5, a bracket or other retaining mechanism 116 holds the camera 104 and is attachable to the rig 102. In the illustrated embodiment, a ball and socket mount 118 is used to attach the mounting bracket 116 and camera 104 to the rig 102. This enables the camera 104 to be selectively adjustable in orientation, such as pivoting about an axis, so that the camera 104 is placed at the appropriate angle for properly capturing images for photogrammetry use.

The ball and socket mount 118 may comprise a threaded tripod adapter 120 having an exteriorly threaded end 122 which is threadedly received within an interiorly threaded aperture 124 of the pole or rig 102. Another externally threaded portion 126 is threadedly received within interiorly threaded aperture 128 of the ball and socket member 118, so as to attach the ball and socket member 118 to the rig 102. Another threaded tripod adapter 120 may similarly attach the ball and socket mount 118 to the camera body mount 116. Attaching the camera 104 to a ball and socket mount 118, or the like, enables the camera 104 to be selectively rotated about an axis thereof. Attaching the cameras 104 to opposite ends, or different sections of the rig 102 enables the cameras 104 to be spaced apart from one another, and preferably the distance therebetween selectively adjusted as needed.

Figure 6:
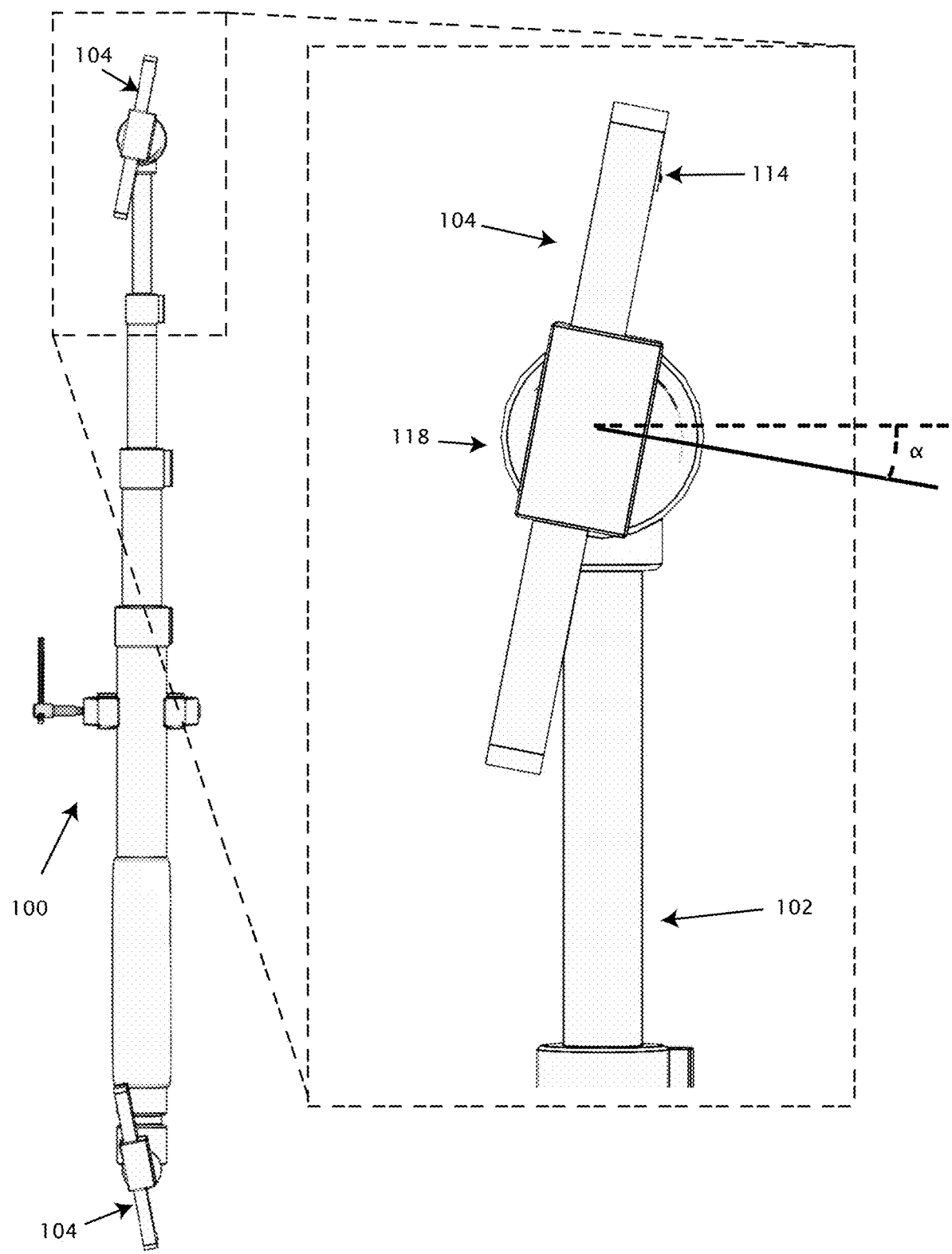
FIG. 6 is a diagrammatic view illustrating proper positioning of a camera, in accordance with the present invention.
Figure 7:
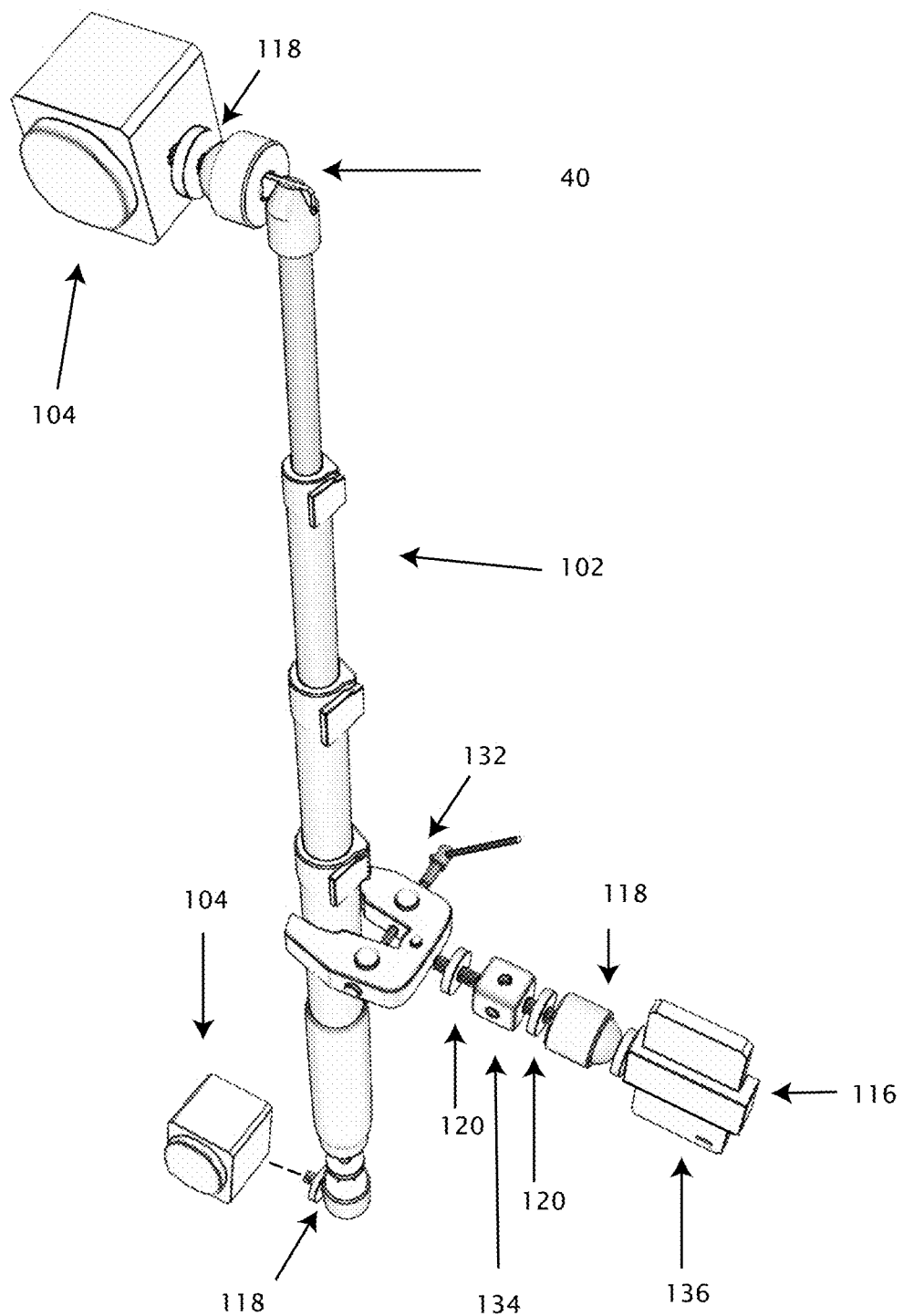
FIG. 7 is a perspective view similar to FIG. 2, but illustrating use of different cameras as well as a mounted remote trigger device used in an embodiment of the present invention.

With reference now to FIG. 6, in accordance with the present invention, the cameras 104 must be angled towards one another by a predetermined amount such that the images captured by each camera 104 can later be properly processed by the necessary photogrammetry or related software so as to construct three-dimensional geometry from the two-dimensional images. This is due to the images taken by each camera 104 having a common focal point. In accordance with the present invention, the cameras 104 are pivoted or angled such so as to have an angle "α" from a center point thereof or a generally horizontal plane, as illustrated in FIG. 6, such that the cameras 104 are angled towards one another. Two cameras are angled between 5 degrees and to a maximum of 22.5 degrees towards one another. The cameras for example, each may be angled approximately 10 degrees towards one another. The angle "α" can change, however, depending upon the object being filmed, its proximity to the device 100, and its size. For example, if three cameras are used, any two nearby cameras will need to be 10-11.25 degrees angled or tilted towards each other to achieve the maximum 22.5 degree angular separation. As illustrated in FIG. 6, the camera 104 at the upper end of the rig 102 will be tilted such that the camera lens 114 of the camera 104 is tilted between 5 and 11.25 degrees downwardly, while the lower camera 104 will be tilted 5-11.25 degrees upwardly, such that the focal points of the lenses 114 of each will converge. It will be understood that the cameras 104 are operated simultaneously, such that each is capturing images of the object at substantially the same time which enables the software to later recreate a three-dimensional image from the two-dimensional captured images taken by the cameras 104.

Figure 8:
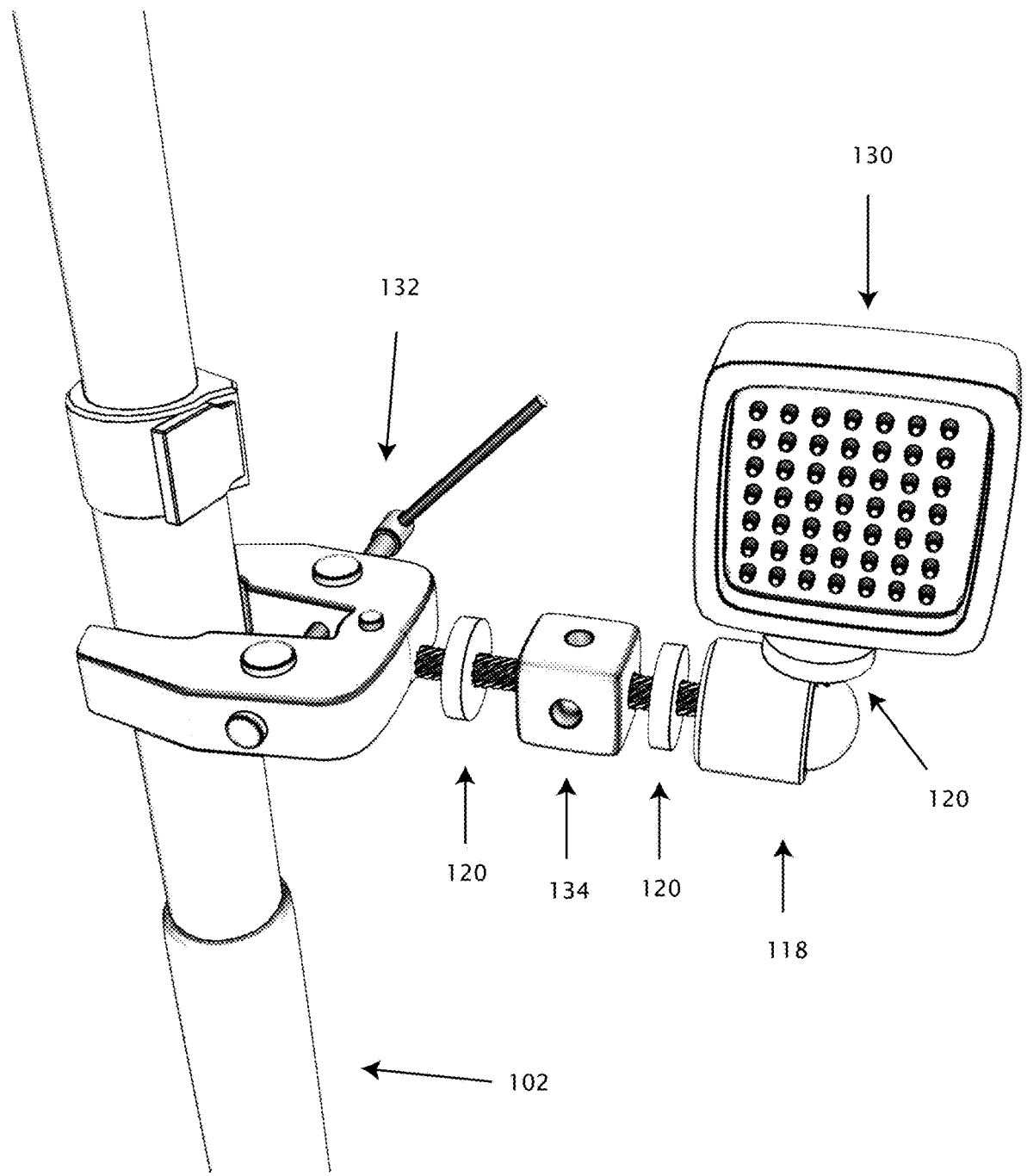
FIG. 8 is a partially fragmented and enlarged perspective view of a light source removably attached to a rig of the device, in accordance with the present invention.

The device 100 may have other components attached to the rig 102 as necessary or deemed desirable. For example, as illustrated in FIG. 8, a light source 130, such as the illustrated LED array, may be coupled to the rig 102 to illuminate the object or area being photographed. The light source 130 may be detachably connected to the rig 102 by any acceptable mounting means. An extension clamp 132 is shown, for exemplary purposes, which enables manual removable attachment of the light source 130 to the rig 102. It will be appreciated that other mounting and attachment mechanisms may be utilized. In the embodiment illustrated in FIG. 8, the clamp mount 132 is coupled to the light source 130 by means of a plurality of threaded tripod adapters 120 a multi-accessory hub 134 and a ball and socket or other swiveling connecting member 118. This enables the light source 130 to be pivoted and rotated to an appropriate angle, as needed.

It will be appreciated that other accessories and components can be attached to the rig 102 as needed or desired. For example, as illustrated in FIG. 7, a controlling device 136, which may comprise a smartphone or the like, may operate as a remote trigger for two smaller cameras 104 mounted on the rig 102, such as previously illustrated and described. Stereo photography, or capture of images, may be perfectly synchronized by the remote trigger device 136, which can be attached via the clamp mount 132, or any other acceptable mounting means.

It should be understood that the cameras 104 do not require a viewing screen, as most smartphone or cellphone-style cameras have, since their imagery can be either saved in memory associated with the camera 104 and/or broadcast, such as to the control device 136, for visual purposes, or not observed until images have been removed from the camera's built-in storage or other remote storage to another storage device, such as a computer, for later processing. Control of the cameras 104 may be through a small wireless network connection, such as Bluetooth, a dedicated Wi-Fi connection or the like.

Figure 9:
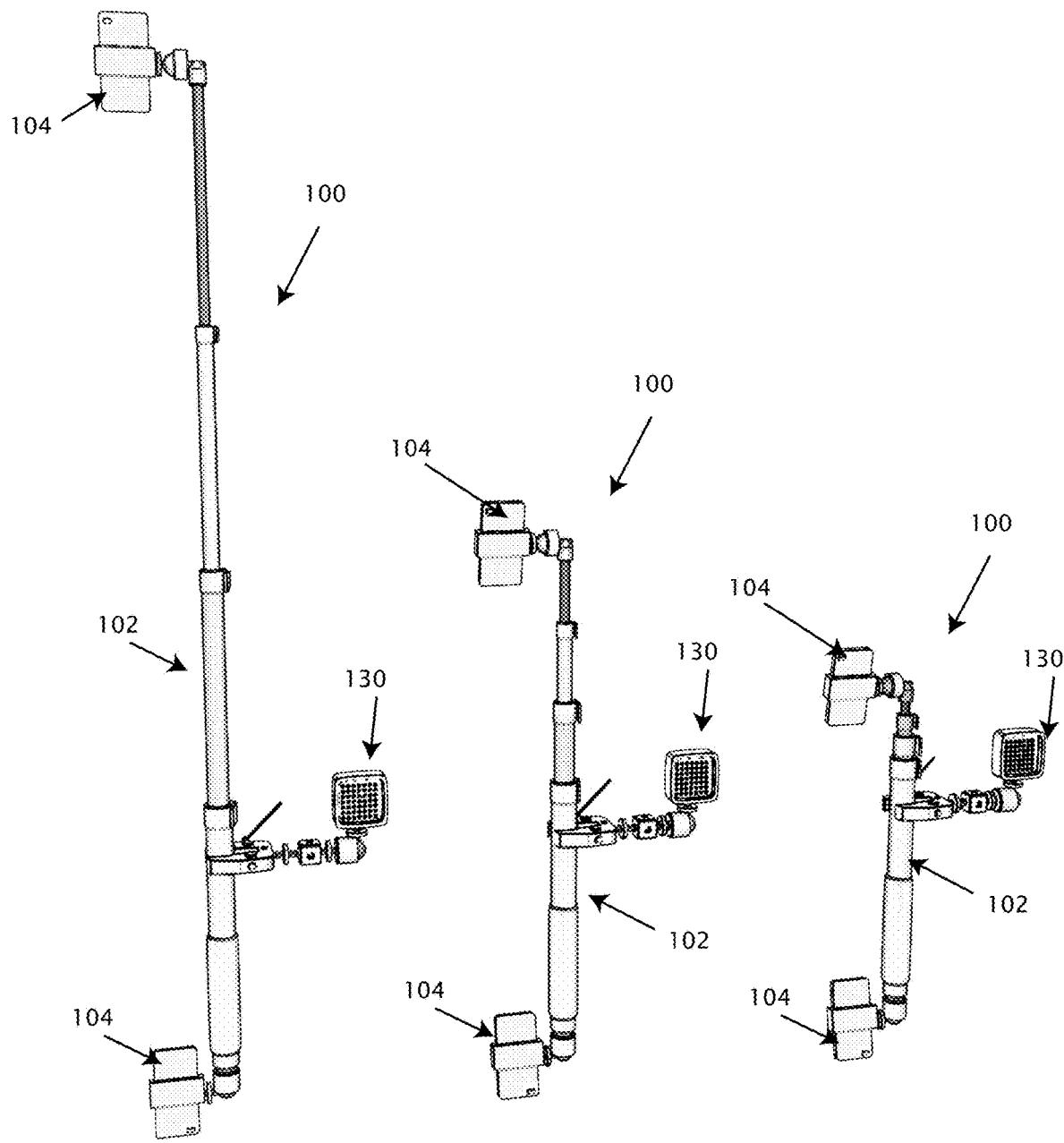
FIGS. 9A-9C illustrate adjustment of the length of the rig of the device in accordance with the present invention.

With reference now to FIGS. 9A-9C, extension and retraction of the rig 102, in the form of a pole having telescopic sections, is shown. The monopod, telescopic pole can be expanded to four feet or greater in length, as illustrated in FIG. 9A, or retracted to a much smaller length, such as approximately a foot or two in length, as shown in FIG. 9C. The cameras 104 and light source 130 are shown attached to the rig 102, as illustrated and described above.

Figure 10:
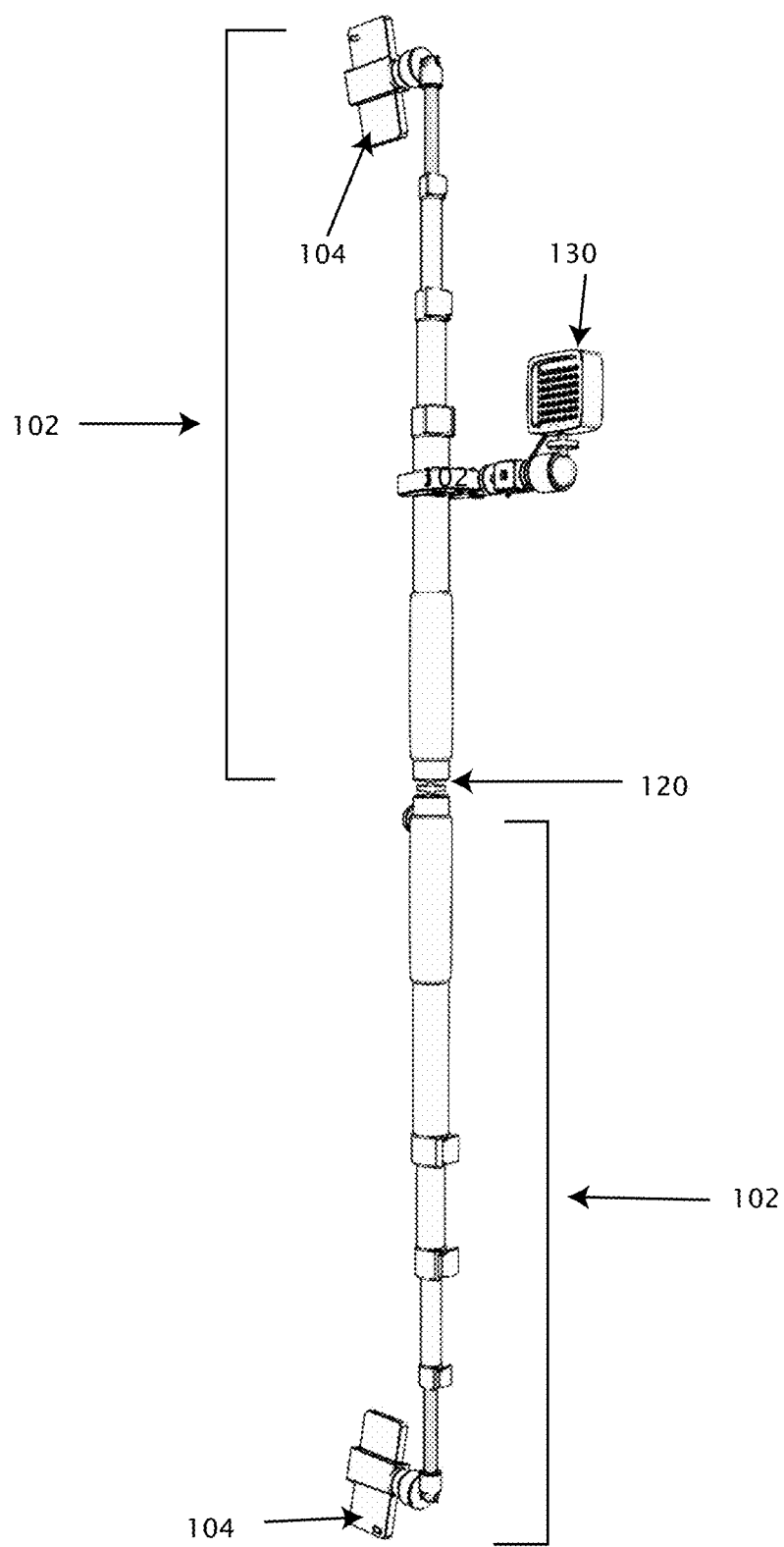
FIG. 10 illustrates expansion of the rig, in accordance with the present invention.

With reference now to FIG. 10, the invention also contemplates expanding or increasing the distance between the cameras 104 by coupling two rigs 102 to one another, such as by using a threaded tripod adapter 120 inserted into an open interior threaded end of each rig or pole 102, so as to attach the ends of the poles or rigs 102 to one another. In the embodiment illustrated in FIG. 10, a camera 104 is attached to each opposite end of each rig 102 which are connected to one another, so as to increase the distance therebetween.

Figure 11:
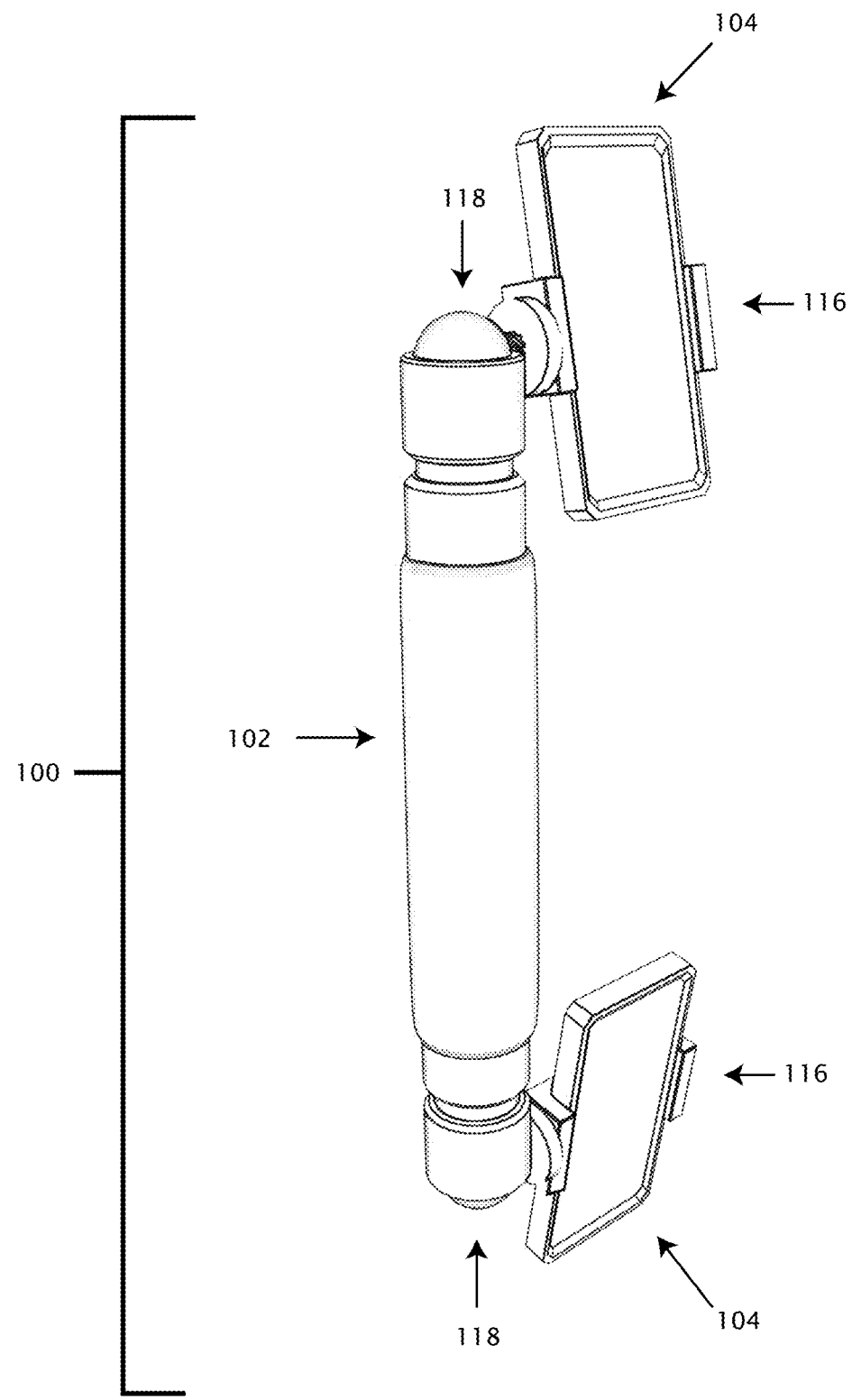
FIG. 11 is a perspective view of a smaller rig embodying the present invention.

The device 100 should be of a size to be portable, such as being handheld and carried by a user and operator so as to capture images of a desired object in order to overcome the drawbacks associated with prior art systems. With reference to FIG. 11, in some cases, a relatively small and compact device 100 or rig 102 may be desired. Thus, the size of the rig 102 can be selectively adjusted as desired, or the length thereof may be selected, such as selecting a "mini-rig" 102 as illustrated in FIG. 11.

Figure 12:
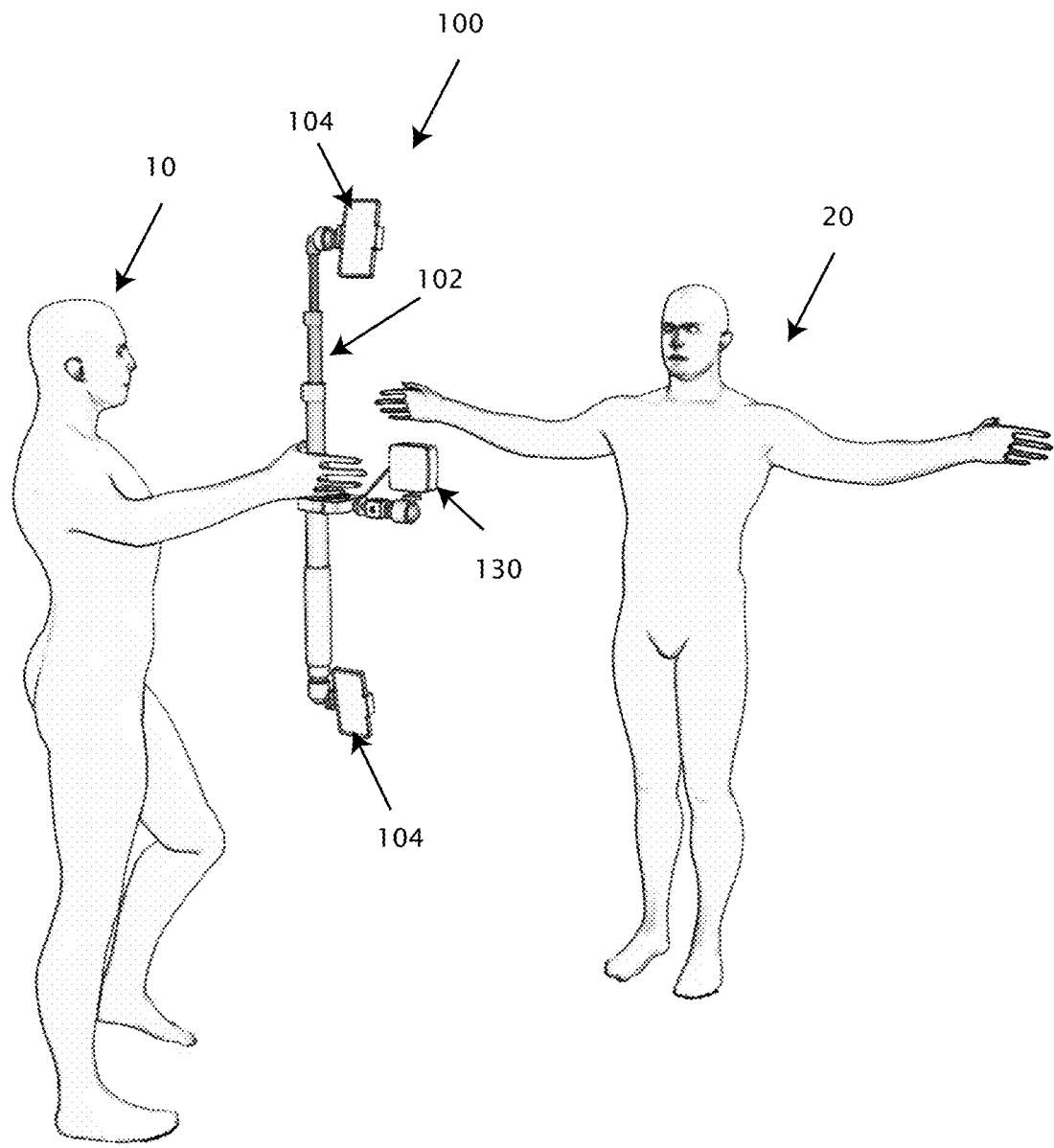
FIG. 12 is a diagrammatic view illustrating use of the device in accordance with the present invention.

With reference now to FIG. 12, device 100 is typically carried by the operator 10, such as grasping rig or pole 102, which may be provided with a hand grip, and directed at the object or area to be photographed. The operator 10 activates the control device, control software or begins photographing with the cameras 104 such that the cameras 104 take video or photograph images on an ongoing basis at a given interval rate. This may be done by selecting a burst mode, utilizing intervalometer software, or the like. The operator 10 does not need to manually actuate the cameras 104 individually for each photograph taken as it is desired that a large number of images will be captured over a relatively short period of time. The operator 10 then moves the device 100 relative to the object or area 20 to be photographed, such as walking around the object 20 and/or manually moving and scanning a larger object or area. The rate at which the cameras 104 take multiple photographs can be modified by camera settings, onboard software or the like, such that a set of images preferably no more than twenty-two degrees apart are taken while the device 100 is moved around or across the subject or object 20 as needed, maximizing the amount of parallax between the cameras 104 and subject matter object 20 to capture it at multiple angles. The built-in offset of the system with its attached cameras 104 improves the likelihood that photogrammetry software will triangulate a three-dimensional point in space, as there is a constant stereo 3D parallax relationship between the cameras due to their distance apart from one another and being angled towards each other, as described above. The photogrammetry software involves the mathematical process of triangulating known features to extract depth information from several two-dimensional images to reconstruct a three-dimensional model of the visible service of the subject or object which is photographed.

Figure 13:
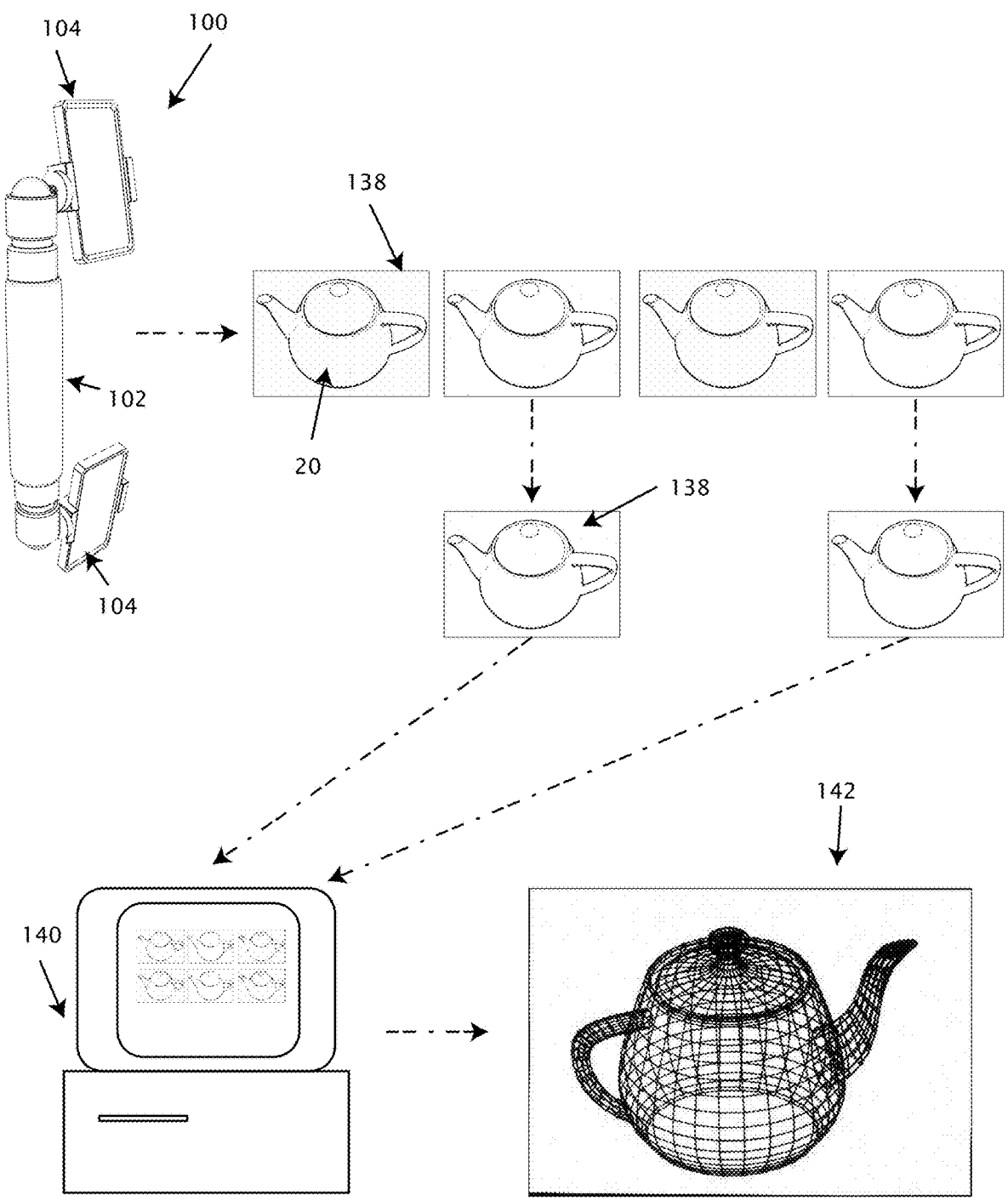
FIG. 13 is a diagrammatic view illustrating steps taken in accordance with the present invention.

With reference now to FIG. 13, a diagrammatic illustration is provided depicting the device 100 capturing images 138 of an object, in the form of a teapot 20. When utilizing burst mode, the cameras 104 may capture hundreds of two camera, directly associated photographic images 138 within a relatively short period of time, such as within a few seconds, which is one of the advantages of the system and method of the present invention. A typical static photogrammetry device is limited by the number of cameras aimed at the subject or object to be photographed, essentially one sample per camera position, but the present invention is mobile and may photograph hundreds of images in a short amount of time from multiple angles, under varied photographic conditions. The large amount of photographs and images generated in this manner negate some of the downside of photographing while moving the cameras 104, overcoming error due to motion blur by super-sampling the subject object 20 with images 138. This dense set of images 138 improves the likelihood that the photogrammetry software will identify corresponding three-dimensional surfaces.

The upper line of images in FIG. 13 represent images 138 captured in a rapid burst mode. The lower line of images 138, which are more spaced apart from one another in FIG. 13, represent a lower burst rate mode and/or intervalometer acquired images which are taken in a more controlled manner, typically utilizing intervalometer software operably coupled and operating in conjunction with the cameras 104, although the intervalometer may also comprise an intervalometer device operably coupled to the cameras 104. These captured images 138 are downloaded onto a computer 140 for processing using the photogrammetry software application. The result is a digital reconstruction of a three-dimensional geometry of corresponding 3D points and surfaces, represented by image 142 in FIG. 13, using at least a plurality of the captured images 138. Given the large number of images 138 captured in accordance with the present invention, images which are blurred, out of focus, redundant or otherwise unnecessary are not used as there are a sufficient number of good quality, usable digital two-dimensional images which can be used to process and create the three-dimensional surface and image.

Depending upon the distance and subject matter, the rate of photography and capturing of images may be altered for best effect. For example, burst mode, in which multiple images are captured at an accelerated rate and at the highest resolution, may be the best choice for closer subject matter objects. However, very large objects or areas may require one photograph every second. The invention is meant to be flexible in this manner through software upgrades that improve the result or modify the core function.

The burst rate may vary on distance and scale of the subject matter. For example, scanning a person can reasonably be done in less than a minute, and perhaps in as little as fifteen seconds, over which time an entire circle around the subject or object 20 occurs. This must be filled with captured images no greater than 22.5 degrees apart from one another, so a high rate of burst capture is required. However, when scanning a large object or subject, such as a mountainside, it could take several minutes to traverse the distance, and the 22.5-degree angle from the subject might require images shot several seconds apart. This may be controlled by the burst rate selected for the camera, the intervalometer device and/or software, and/or the manner in which the cameras are remotely triggered using dedicated Bluetooth paired controllers, local Wi-Fi networks or the like. This is what is referred to herein as automatedly actuating the cameras to capture images of an object at a minimum rate over time in which a sufficient number of images are captured to meet or exceed the 22.5-degree angle separation between captured images.

Figure 14:
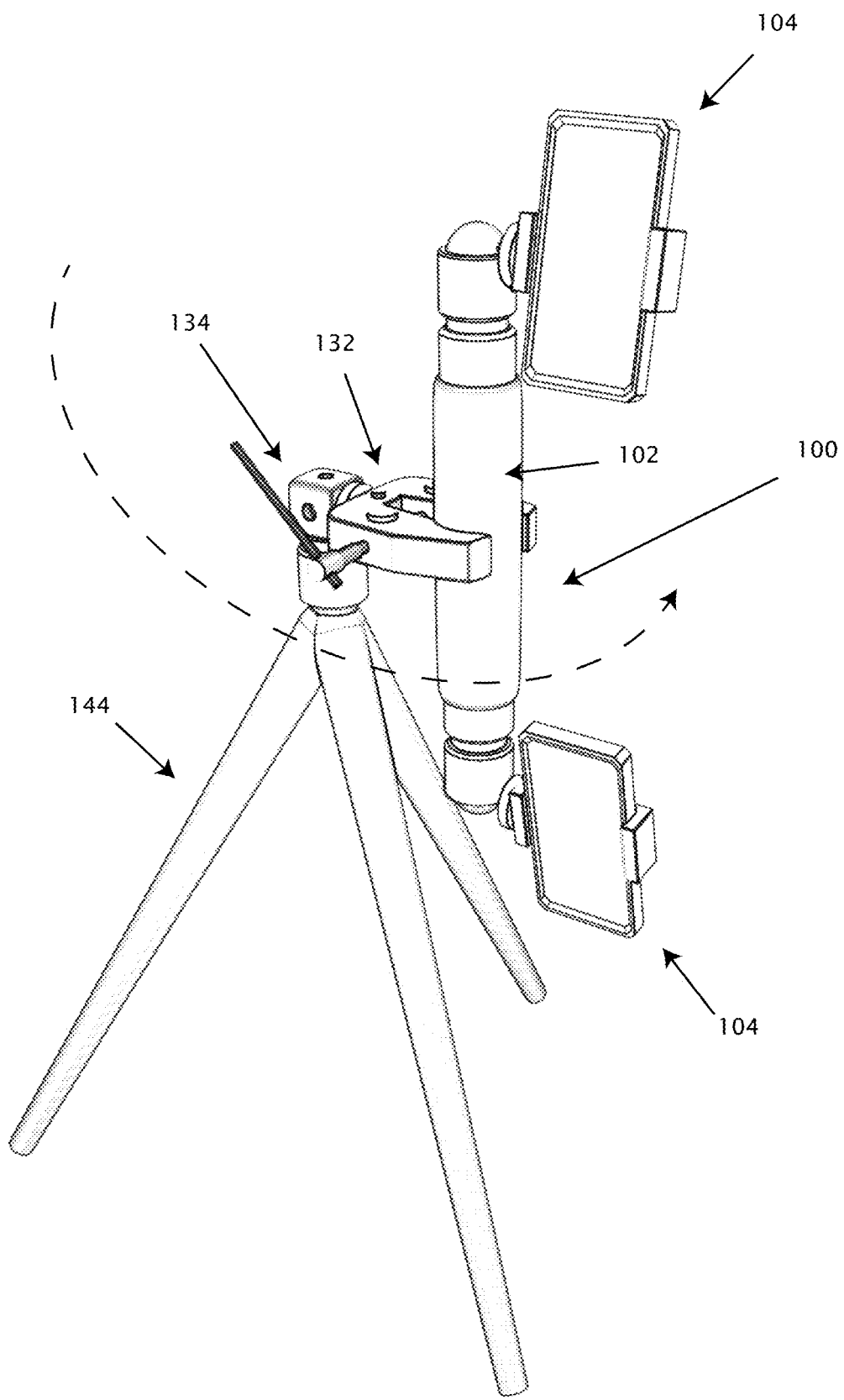
FIG. 14 illustrates a device of the present invention attached to a tripod.

With reference now to FIG. 14, the device 100 may be mounted to a tripod 144 instead of handheld operation, for example when photographing or scanning panoramic image tiles. The "mini-rig device" or a regular and expandable rig 102 may be attached to the tripod in any acceptable manner, including using the mounting clamp 132 and a multi-accessory hub 134 being interconnected to the clamp 132 and the tripod 144, such as by means of threaded tripod adapters 120 or the like. In the panoramic configuration, as illustrated in FIG. 14, the cameras can also be pointed approximately ten degrees away from each other or the center of the device, as opposed toward the center, which is normally the configuration, but with overlapping fields of view. This may be used, for example, to photograph video or stills as necessary. The clamp-mount introduces an off-center parallax to the attached device 100 while it photographs, as opposed to nodal/centered arrangement that minimizes parallax, that is usually the case in the prior art. The resulting images are photographed in a circle, illustrated by the arcing directional arrow, not from a common point. This offset relationship, or parallax, is preferred for photogrammetry software to build three-dimensional data, rather than simply tile images together.

Figure 15:
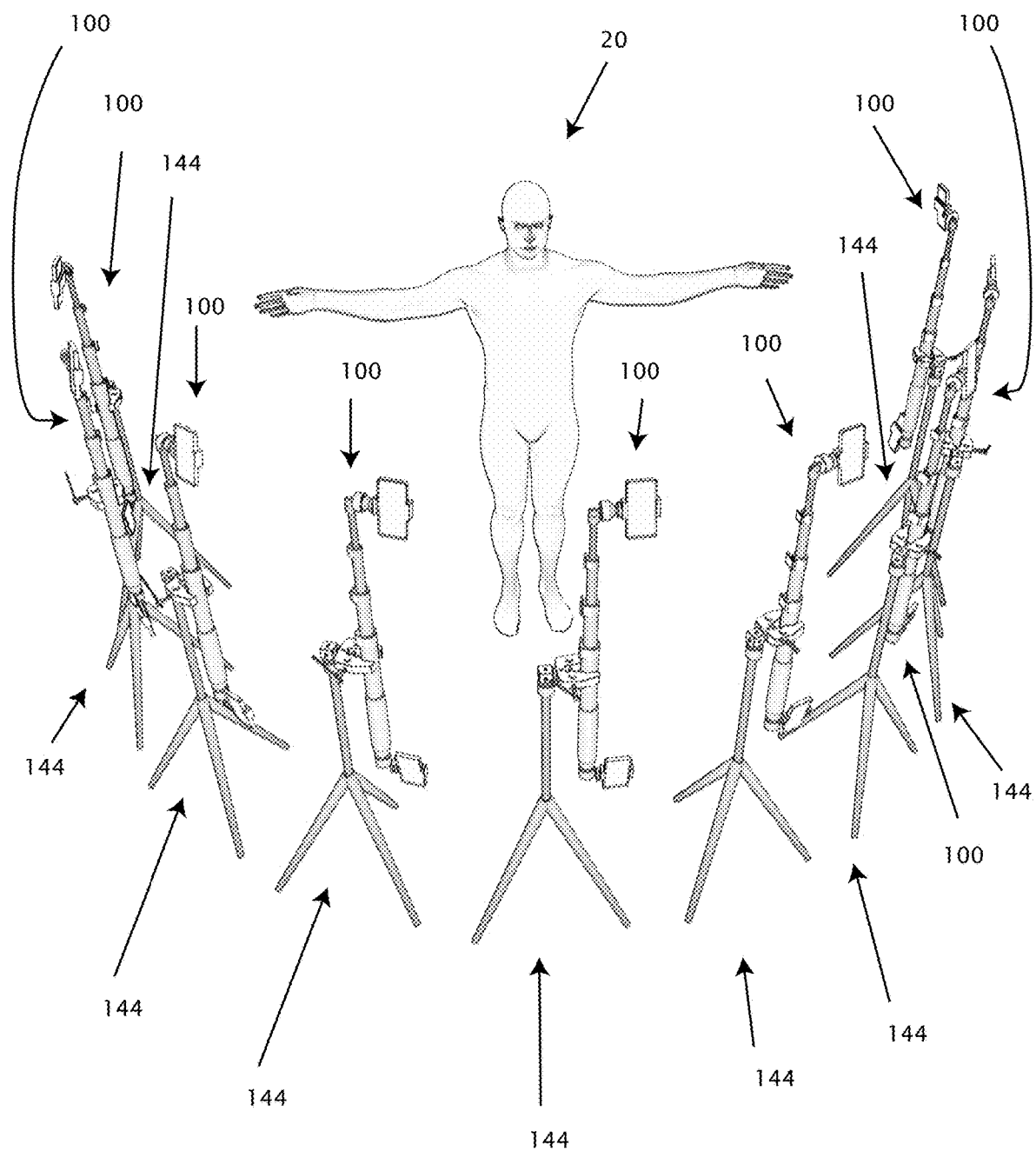
FIG. 15 illustrates a plurality of devices embodying the present invention attached to a plurality of tripods surrounding an object to be filmed, in accordance with the present invention.

With reference now to FIG. 15, the tripod mounting, and remote operation, allow these devices 100 to be used in tandem with multiple devices of any size. These can be grouped together on several mounting tripods 144, as illustrated in FIG. 15, and used as a traditional scanning volume. Each device 100 ideally could contain three cameras mounted equidistant from each other, using clamp mounts to provide connection points, but the illustrated default two camera-based devices will also work. A series of these devices are placed around the subject or object 20 to be scanned or photographed with roughly twenty degrees of parallax between them. The cameras of the devices 100 can be actuated in automated fashion, such as being triggered remotely. This could be done, for example, in lieu of walking around a subject or object 20 to be photographed, which would reduce or even eliminate the number of blurred or unusable images and ensure a desired degree of parallax or overlapping or separation of the captured images. However, each of the devices 100 and tripods 144 would still be portable and easily and conveniently moved from location to location, as necessary. Moreover, a device 100 could be detached from the tripod 144, or even the entire coupled tripod 144 and device 100, lifted and moved manually at any given time if required or desired.

Figure 16:
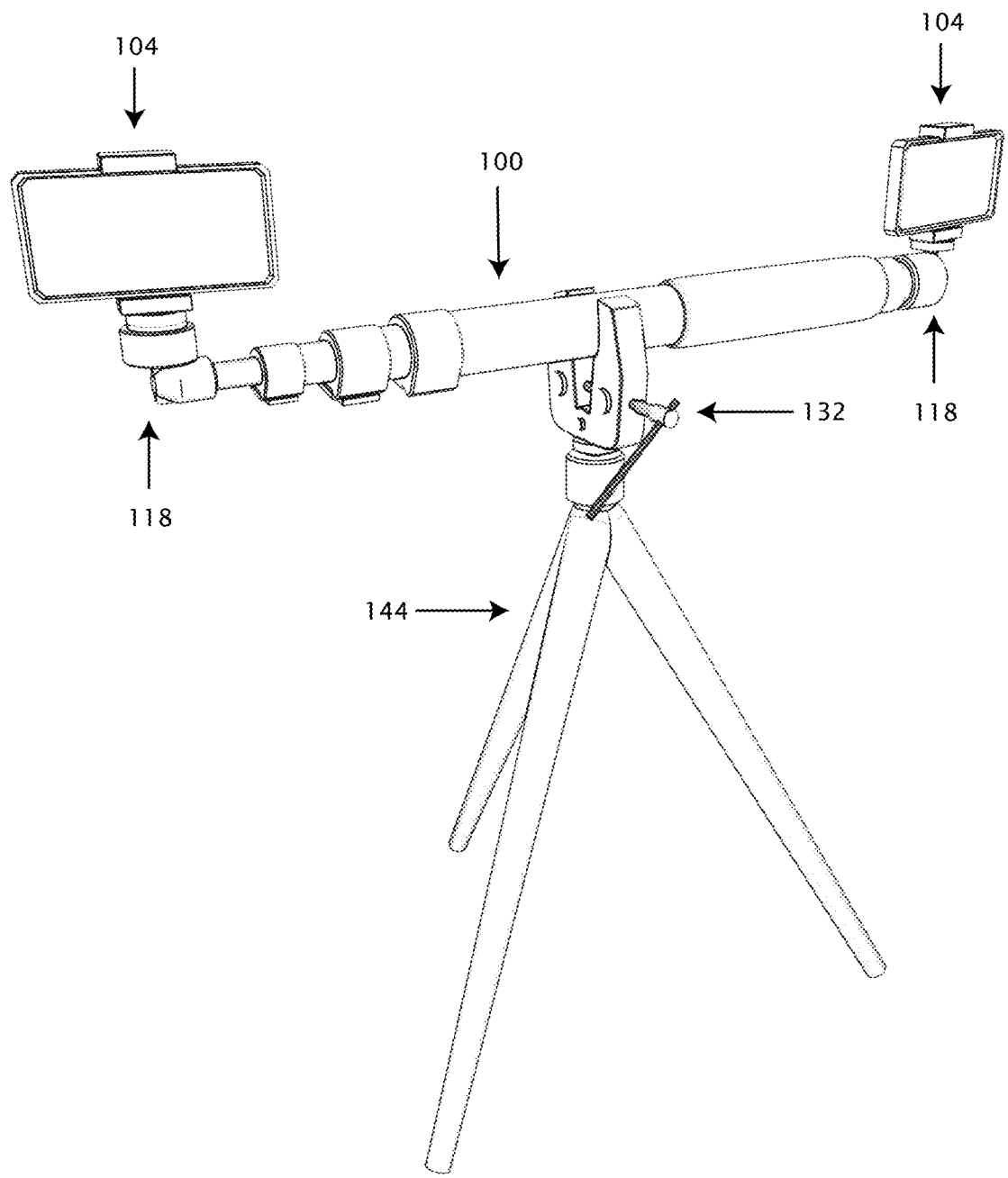
FIG. 16 illustrates a device embodying the present invention mounted horizontally on a tripod, in accordance with the present invention.

With reference now to FIG. 16, in another embodiment of the invention, the device 100 is mounted on the tripod 144 horizontally, instead of vertically, with the camera mounts turned ninety degrees to the upward side of the device by reconfiguring the ball and socket 118 position, such that both cameras are angled towards each other at the desired angle, typically between 5 and 22.5 degrees toward each other, and preferably roughly 10 degrees per camera. This arrangement can capture standard still frames, but also can capture synchronized stereo 3D video images for later photogrammetry or performance capture systems or the like. This enables hyper-stereo video capture and the like.

It will be appreciated that the system of the present invention can utilize and incorporate commonly used and off-the-shelf components and devices to construct the device 100 of the present invention, including commonly available telescopic poles or rigs, clamps, mounts, cameras, tripods, light sources, and existing photogrammetry software. This enables the system to be created conveniently and relatively inexpensively, while resulting in a relative uncomplicated and easy-to-use device 100 which can controllably capture images of an object or other subject matter to be photographed in a quick and easy manner and at a relatively low cost.

As described above, the present invention is directed to a camera suspension and software control device that acquires multiple photographs or digital images in a controlled manner, such as using intervalometer software, which allows a camera to take photographs at determined intervals to time-lapse photography, burst mode, to rapidly take photographs at the highest capable resolution, or video capture using a minimum of two cameras attached to an adjustable, handheld telescopic pole or other type of adjustable handheld rig. The device can utilize multiple connection points to mount other cameras, light sources, or handles as necessary, and is expandable to photograph much larger objects from close or far range under various lighting conditions in a short amount of time for the purposes of photogrammetry, 3D video, or as part of a larger series of cameras to photograph an object from all angles.

To acquire data from large areas or objects, the device is capable of physically connecting with other similar devices, or as an array of devices to photograph or scan massive areas. It is also extendable to different lengths to gather data using a single device, and is fully collapsible for modern air transport carry-on luggage, as it is generally based around existing consumer cameras and support gear for the main photography. Various types of cameras, including smartphone cameras, can be used in connection with the system and method of the present invention which may be remotely triggered, or controlled by intervalometer capture or selected burst mode. The invention can be reconfigured for stereo video capture as well, for multiple frame reconstruction. The device is designed to be sufficiently lightweight for potential mounting on a drone, robotic arm or even crane systems, depending upon the object or area to be scanned or photographed and the immediate needs given the circumstances.

Although several embodiments have been described in detail for purposes of illustration, various modifications may be made without departing from the scope and spirit of the invention. Accordingly, the invention is not to be limited, except as by the appended claims.

What is claimed is:

1. A portable system for capturing photogrammetry images, comprising:
   a handheld, portable rig;
   at least two cameras supported on the rig in selectively adjustable spaced apart relation to one another, and the cameras being selectively oriented with respect to one another such that the cameras are directed away from a user holding the rig and towards an object to be photographed, the cameras having a burst mode or an intervalometer or coupled to an intervalometer such that an image capture rate of the camera is adjustably selectable;
   wherein the cameras are selectively positioned relative to one another and the image capture rate is selected according to a size of the object and/or a distance of the cameras to the object so that the captured images of the object are taken by the cameras at a minimum rate over time and no greater than 22.5 degrees apart from one another as the cameras are moved relative to the object so as to maximize parallax between the cameras and the object and the captured images are suitable for photogrammetry three-dimensional model reconstruction of the object.

2. The system of claim 1, wherein the rig comprises a pole.

3. The system of claim 2, wherein the pole comprises at least two sections removably connected to one another or telescopically fitted to one another.

4. The system of claim 3, wherein the cameras are attached to different sections so that the distance between the cameras is selectively adjustable.

5. The system of claim 1, wherein the cameras comprise two cameras angled between 5 and 22.5 degrees towards one another.

6. The system of claim 1, wherein the cameras are attached to the rig so as the position or orientation of the camera relative to the rig is selectively adjustable.

7. The system of claim 1, wherein each of the cameras comprise small format cameras.

8. The system of claim 1, wherein the cameras comprise cameras of smartphones.

9. The system of claim 1, wherein the cameras capture images using a selectively adjustable burst mode.

10. The system of claim 1, including an intervalometer or intervalometer software associated with the cameras that actuates the cameras and adjustably controls the rate of images captured over time.

11. The system of claim 1, including a light source coupled to the rig.

12. A method for capturing photogrammetry images, comprising the steps of:
    providing a portable rig supporting at least two cameras in selectively adjustable spaced apart relation to one another;
    orienting the cameras such that the cameras are directed away from a user holding the rig and images captured by the cameras of an object are usable for photogrammetry model reconstruction of an object;
    automatedly actuating the cameras so that they capture images of the object at a predetermined rate over time, wherein the automated actuation of the camera is selectively adjustable using a burst mode or intervalometer so as to have an image capture rate according to a size of the object and/or distance of the cameras to the object; and
    digitally reconstructing a three-dimensional model geometry of the object using at least a plurality of the captured images;
    wherein the cameras are positioned and oriented with respect to one another and actuated at an image capture rate such that as the cameras are moved relative to the object images captured by the cameras of the object are taken at a minimum rate over time and no greater than 22.5 degrees apart from one another so as to maximize parallax between the cameras and the object and enable the digital photogrammetric reconstruction of the three-dimensional model of the object using the captured images.

13. The method of claim 12, including the step of moving the rig relative to the object as the cameras captures images of the object.

14. The method of claim 13, wherein the rig is handheld and manually moved relative to the object.

15. The method of claim 12, including the steps of downloading the captured images to a computer and processing a plurality of the downloaded images using a photogrammetry software application to digitally reconstruct the three-dimensional model geometry of the object.

16. The method of claim 12, including the step of adjusting a position or orientation of a camera relative to the rig.

17. The system of claim 12, including the step of increasing the distance between the cameras by increasing the size of the portable rig.

18. The method of claim 12, wherein the automatedly actuating the cameras step comprises the step of utilizing a burst mode of the cameras or an intervalometer or intervalometer software associated with the cameras.

19. The method of claim 12, wherein the cameras are actuated to coincidently capture images of the object over an interval of time.

20. The method of claim 12, including providing a light source supported by the portable rig and illuminating the object.

21. The method of claim 1, wherein the cameras are angled between 5 and 22.5 degrees towards one another.

22. The system of claim 2, wherein the pole comprises a vertical pole and the cameras are attached to the pole in vertical spaced relation to one another.

23. The method of claim 12, including the step of attaching at least two cameras in vertical spaced relation to one another on the rig.

* * * * *